(12) United States Patent
Seto

(10) Patent No.: US 7,406,870 B2
(45) Date of Patent: Aug. 5, 2008

(54) SEMICONDUCTOR SENSOR

(75) Inventor: Masami Seto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/302,789

(22) Filed: Dec. 14, 2005

(65) Prior Publication Data

US 2006/0144144 A1 Jul. 6, 2006

(30) Foreign Application Priority Data

Jan. 6, 2005 (JP) .............................. 2005-001239

(51) Int. Cl.
*G01P 15/08* (2006.01)
(52) U.S. Cl. .................................. 73/514.33; 73/514.38
(58) Field of Classification Search ............... 73/514.33, 73/514.34, 514.36, 514.38, 514.29; 338/2, 338/5
See application file for complete search history.

(56) References Cited

U.S. PATENT DOCUMENTS

| | | | | | |
|---|---|---|---|---|---|
| 4,071,838 | A | * | 1/1978 | Block | 338/47 |
| 4,129,042 | A | * | 12/1978 | Rosvold | 73/727 |
| 4,869,107 | A | * | 9/1989 | Murakami | 73/514.33 |
| 5,121,180 | A | * | 6/1992 | Beringhause et al. | 257/417 |
| 5,351,542 | A | * | 10/1994 | Ichimura et al. | 73/514.33 |
| 5,643,803 | A | * | 7/1997 | Fukada et al. | 438/50 |
| 5,719,336 | A | * | 2/1998 | Ando et al. | 73/514.32 |
| 5,798,641 | A | * | 8/1998 | Spagna et al. | 324/228 |
| 6,321,600 | B1 | * | 11/2001 | Hirose et al. | 73/514.34 |
| 6,683,358 | B1 | * | 1/2004 | Ishida et al. | 257/417 |
| 6,892,578 | B2 | * | 5/2005 | Saitoh et al. | 73/514.33 |
| 6,931,928 | B2 | * | 8/2005 | Hashimoto et al. | 73/514.33 |
| 6,988,407 | B2 | * | 1/2006 | Yamaguchi et al. | 73/493 |
| 7,010,976 | B2 | * | 3/2006 | Ozawa et al. | 73/504.12 |
| 7,107,847 | B2 | * | 9/2006 | Yoshida et al. | 73/514.33 |
| 7,132,722 | B2 | * | 11/2006 | Ohashi | 257/415 |

FOREIGN PATENT DOCUMENTS

| | | | |
|---|---|---|---|
| JP | 07-294548 | * | 11/1995 |
| JP | 2670048 | | 7/1997 |
| JP | 2004-233072 | | 8/2004 |
| JP | 2004-233080 | | 8/2004 |
| JP | 2004-257832 | | 9/2004 |

* cited by examiner

*Primary Examiner*—Helen C. Kwok
(74) *Attorney, Agent, or Firm*—Cooper & Dunham, LLP

(57) ABSTRACT

A semiconductor sensor is disclosed that includes a proof mass, a frame that is arranged around the proof mass, a beam that is arranged at the surface side of the frame and is configured to support the proof mass, plural piezo-resistive elements arranged on the beam, plural metal wiring patterns and pad electrodes that are arranged on the surface of the frame and are electrically connected to the piezo-resistive elements, a cover plate that is fixed to the surface of the frame and is arranged to be spaced apart from the proof mass and the beam, and a cover plate fixing region for fixing the cover plate to the surface of the frame, the cover plate fixing region including a formation region for the metal wiring patterns.

17 Claims, 5 Drawing Sheets

SEMICONDUCTOR SENSOR

BACKGROUND OF THE INVENTION

1. Field of the Invention

The present invention relates to a semiconductor sensor such as a semiconductor accelerometer or a semiconductor gyroscope that uses a piezo-resistive element.

2. Description of the Related Art

A semiconductor sensor may be used to measure the acceleration in the traveling direction or in the lateral direction of a moving vehicle, or to measure the shaking of a video camera.

One type of semiconductor sensor may have a piezo-resistive element fabricated on the surface of a silicon single crystal wafer through an IC (integrated circuit) fabrication process, and this piezo-resistive element may be used as a strain gauge (e.g., see Japanese Patent No. 2670048, Japanese Laid-Open Patent Application No. 2004-233080, and Japanese Laid-Open Patent Application No. 2004-257832). Such a semiconductor sensor using the piezo-resistive element includes a thin-walled beam that may be realized by creating concave portions through etching on the rear face of the silicon wafer at the region where the piezo-resistive element is arranged, for example. The beam is configured to deform in response to acceleration, and in turn, the resistance of the piezo-resistive element may change according to the deformation of the beam so that an electric signal corresponding to the acceleration may be obtained.

Also, a proof mass is attached to the beam at one side to facilitate deformation of the beam. The end of the beam at the other side that is opposite from the side that is attached to the proof mass is connected to a support element. The support element includes plural metal wiring patterns and plural pad electrodes that are electrically connected to the piezo-resistive element.

Also, a cover plate may be arranged over the beam and the proof mass to control the moving distance of the proof mass so as to prevent the beam from receiving a large impact and being damaged, the cover plate being spaced apart from the beam and the proof mass by a predetermined distance (e.g., see Japanese Laid-Open Patent Publication No. 2004-233072).

In the semiconductor sensor as is disclosed in Japanese Laid-Open Patent Publication No. 2004-233072, small concave portions are arranged at plural locations on the surface of the support element to which the flexible element is connected, the depth of the concave portions being arranged to be smaller than the diameter of spherical spacers that are mixed into a silicon rubber resin material, and the cover plate is arranged to be fixed to the support element at the concave portions so that the cover plate may be arranged over the beam and the proof mass.

It is noted that in the case of arranging the cover plate on the beam and the proof mass, when a region dedicated to fixing the cover plate to the support element is provided, the chip area of the semiconductor sensor may be increased.

SUMMARY OF THE INVENTION

The present invention provides a semiconductor sensor in which a cover plate may be arranged over a beam and a proof mass without increasing the chip area.

According to an embodiment of the present invention, a semiconductor sensor is provided that includes a proof mass;

a frame that is arranged around the proof mass;

a beam that is arranged at the surface side of the frame and is configured to support the proof mass;

plural piezo-resistive elements arranged on the beam;

plural metal wiring patterns and pad electrodes that are arranged on the surface of the frame and are electrically connected to the piezo-resistive elements;

a cover plate that is fixed to the surface of the frame and is arranged to be spaced apart from the proof mass and the beam; and a cover plate fixing region for fixing the cover plate to the surface of the frame, the cover plate fixing region including a formation region for the metal wiring patterns.

According to a preferred embodiment, the cover plate fixing region is arranged to surround the proof mass and the beam.

According to another preferred embodiment, the pad electrodes are collectively arranged along one side edge of the frame.

According to another preferred embodiment, the cover plate is a transparent glass plate that allows the proof mass and the flexible element to be visible.

According to another preferred embodiment, the surface of the frame is made of a silicon layer, and the cover plate is a glass plate that is fixed to the cover plate fixing region through anodic bonding.

According to another preferred embodiment, the cover plate is a welded glass plate that is fixed to the cover plate fixing region through welding.

According to another preferred embodiment, the cover plate is fixed to the cover plate fixing region by adhesive.

According to another preferred embodiment, the cover plate fixing region includes a dummy pattern that is simultaneously created with the metal wiring patterns.

According to another preferred embodiment, the beam and the surface of the frame are made of the same silicon layer, and the metal wiring patterns and the dummy pattern are arranged on the silicon layer via an insulating film; and the dummy pattern is electrically connected to the silicon layer via a through hole that is arranged at the insulating film.

DESCRIPTION OF THE PREFERRED EMBODIMENTS

In the following, preferred embodiments of the present invention are described with reference to the accompanying drawings.

Figure 1A:
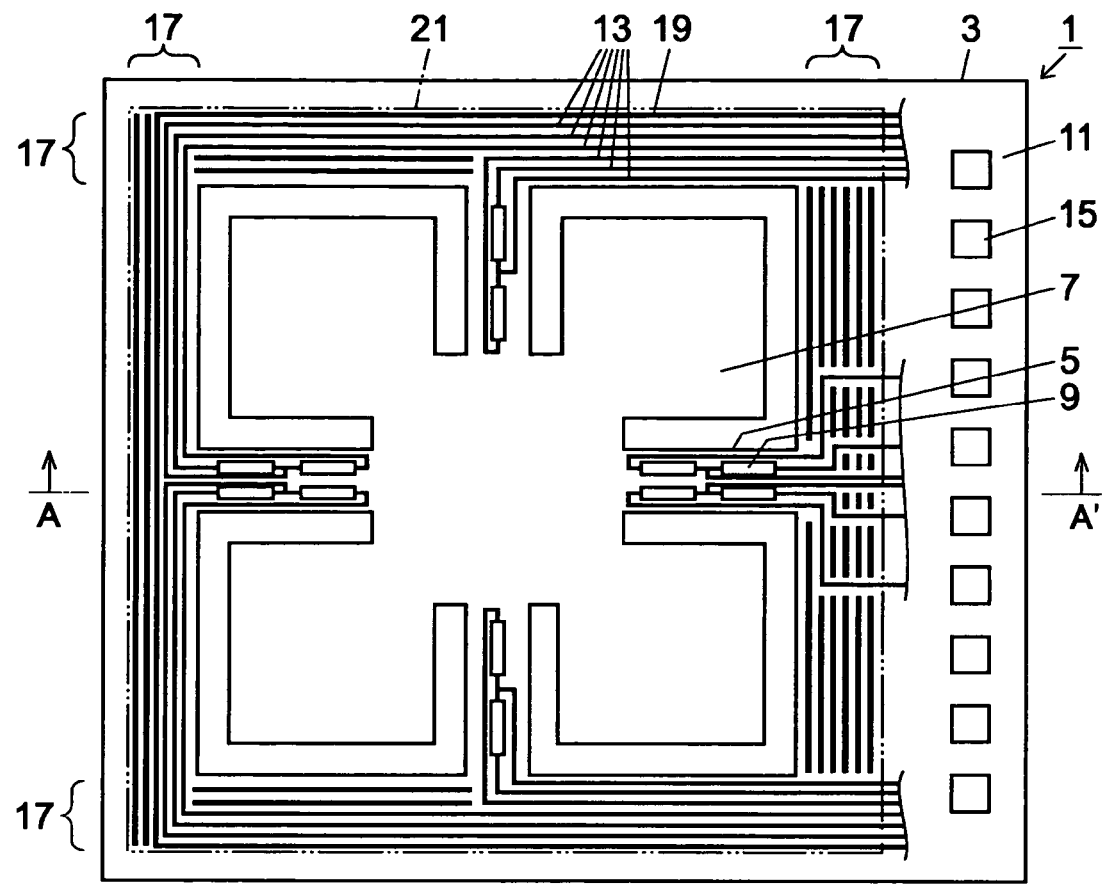
FIGS. 1A and 1B are diagrams showing a configuration of a semiconductor sensor according to one embodiment of the present invention, FIG. 1A being a plan view of the semiconductor sensor of the present embodiment, and FIG. 1B being a cross-sectional view cut across line A-A' of FIG. 1A.
Figure 1B:
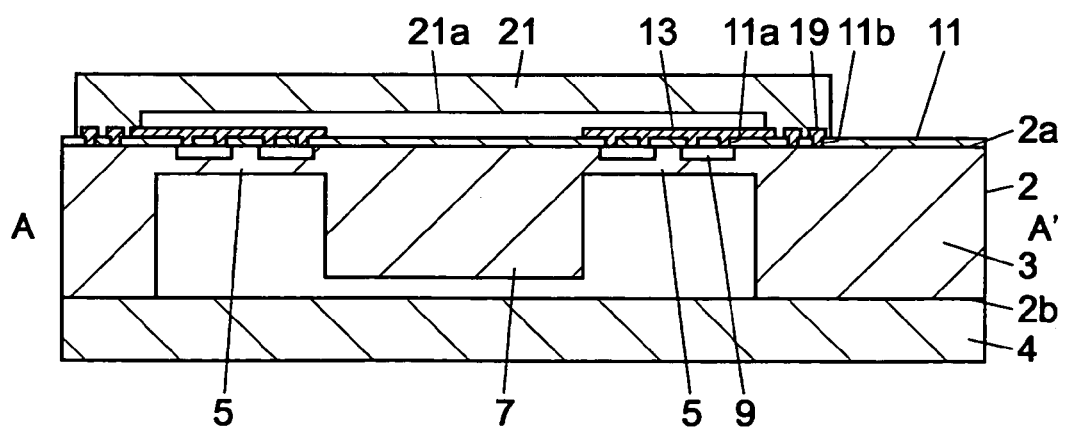

FIGS. 1A and 1B are diagrams illustrating a configuration of a semiconductor sensor according to one embodiment of the present invention, FIG. 1A being a plan view of the semiconductor sensor of the present embodiment, and FIG. 1B being a cross-sectional view cut across line A-A' of FIG. 1A.

The semiconductor sensor 1 as is illustrated in FIGS. 1A and 1B includes a SOI (Silicon-on-Insulator) substrate 2 that may have a 2.0×2.5 mm configuration in plan view and a thickness of 400 μm, for example. A glass pedestal 4 is attached to a rear face 2b of the SOI substrate 2 through anodic bonding, for example. The SOI substrate 2 includes a frame 3, a beam 5 that is arranged to extend from the frame 3 at the surface 2a side of the SOI substrate 2, and a proof mass 7 that is arranged toward the center with respect to the beam 5. A space is created between the frame 3 and the proof mass 7, and piezo-resistive elements 9 are arranged at the beam 5. In this way, a piezo-resistive three-axis semiconductor accelerometer may be realized.

According to the present embodiment, an insulating film 11 made of a NSG (non-doped silicon glass) film having a thickness of 0.8 μm, for example, is arranged on the surface 2a of the SOI substrate 2. Plural metal wiring patterns 13 and pad electrodes 15 made of aluminum with a thickness of 1.0 μm, for example, are arranged on the insulating film 11. The line width of the metal wiring patterns 13 may be 1.4 μm, for example, and the pitch may be 1.5 μm, for example. The pad electrodes 15 may be arranged to have a 70×70 mm configuration in plan view, for example. In the present embodiment, the pad electrodes 15 are collectively aligned along one side edge of the frame 3.

It is noted that in FIG. 1, wiring patterns between the metal wiring patterns 13 and the pad electrodes 15 are not shown.

According to the present embodiment, through holes 11a are arranged at predetermined regions of the insulating film 11 corresponding to the edge positions of the piezo-resistive elements 9. The metal wiring patterns 13 are electrically connected to the piezo-resistive elements 9 via the through holes 11a. It is noted that in FIG. 1A, the piezo-resistive elements 9 are shown for the sake of convenience.

Also, according to the present embodiment, a cover plate fixing region 17 is provided that surrounds the frame 3, the beam 5, and the proof mass 7.

Dummy patterns 19 are created simultaneously with the metal wiring patterns 13 on the insulating film 11 within the cover plate fixing region 17 at regions other than the formation regions for the metal wiring patterns 13. The line width of the dummy patterns 19 may be 1.4-13.0 μm, for example, and the pitch may be 1.4-2.0 μm, for example. It is noted that the dummy patterns 19 are not electrically connected to any of the piezo-resistive elements 9, the metal wiring patterns 13, and the pad electrodes 15.

The dummy patterns 19 are electrically connected to the surface 2a (silicon layer) of the SOI substrate 2 via through holes 11b that are arranged at predetermined regions of the insulating film 11.

According to the present embodiment, a cover plate 21 is fixed to the surface 2a of the SOI substrate 2 via the insulating film 11 to cover the beam 5 formation region and the proof mass 7 formation region. The cover plate 21 may be made of Pyrex glass 7740 (by Corning Incorporated, U.S.A.; Pyrex is a registered trademark) having a thickness of 200-300 μm, for example. A concave portion 21A is created at the center region of the cover plate on the side facing the SOI substrate 2 so that the cover plate 21 may be spaced apart from the beam 5 and the proof mass 7. The peripheral rim portion of the cover plate 21 arranged at the side facing the SOI substrate 2 is fixed to the support portion 3 at the cover plate fixing region 17 through anodic bonding.

It is noted that Pyrex glass is preferably used for the cover plate 21 since Pyrex glass has a linear expansion coefficient that is close to that of silicon. In this way, the frame 3 may be prevented from deforming even when the environmental temperature fluctuates, and in turn, a high-performance sensor that is not susceptible to temperature change may be realized.

According to the present embodiment, the cover plate fixing region 17 for fixing the cover plate 21 to the surface 2a side of the frame 3 includes metal wiring pattern 13 formation regions. In this way, the cover plate 21 may be fixed to the frame 3 without having to provide dedicated regions for fixing the cover plate 21 to the frame 3, and the cover plate 21 may be arranged over the beam 5 and the proof mass 7 without increasing the chip area.

According to one preferred embodiment, the cover plate fixing regions 17 are arranged to surround the beam 5 and the proof mass 7, and thereby, in the case of cutting out the semiconductor sensor 1 from a semiconductor wafer having plural semiconductor sensors arranged thereon, cutting fluid may be prevented from entering into the beam 5 and the proof mass 7 upon performing a dicing process, and the beam 5 may be protected from damage so that a high yield may be realized.

According to another preferred embodiment, the cover plate 21 is arranged to be made of glass so that defects such as damage on the beam 5 or intrusion of a foreign substance such as water into the frame 3 may be visually detected.

According to another preferred embodiment, the cover plate 21 is fixed to the cover plate fixing regions 17 through anodic bonding, and thereby, the cover plate 21 may be fixed to the frame 3 without using adhesive.

According to another preferred embodiment, the dummy patterns 19 are created simultaneously with the metal wiring patterns 13 at the cover plate fixing regions 17, and thereby, the height of the cover plate fixing regions 17 may be arranged to be uniform.

According to another preferred embodiment, the dummy patterns 19 are electrically connected to the silicon layer of the SOI substrate 2 via the through holes 11b arranged at the insulating layer 11, and thereby, the dummy patterns 19 may be set to the same potential as that of the silicon layer so that the cover plate 21 may be efficiently fixed to the frame 3 through anodic bonding.

According to another preferred embodiment, the pad electrodes 15 are collectively arranged along one side of the frame 3, and thereby, chip areas may be efficiently used compared to the case of arranging the pad electrodes 15 along two sides or four sides of the frame 3 so that the chip area may be reduced.

Figure 2:
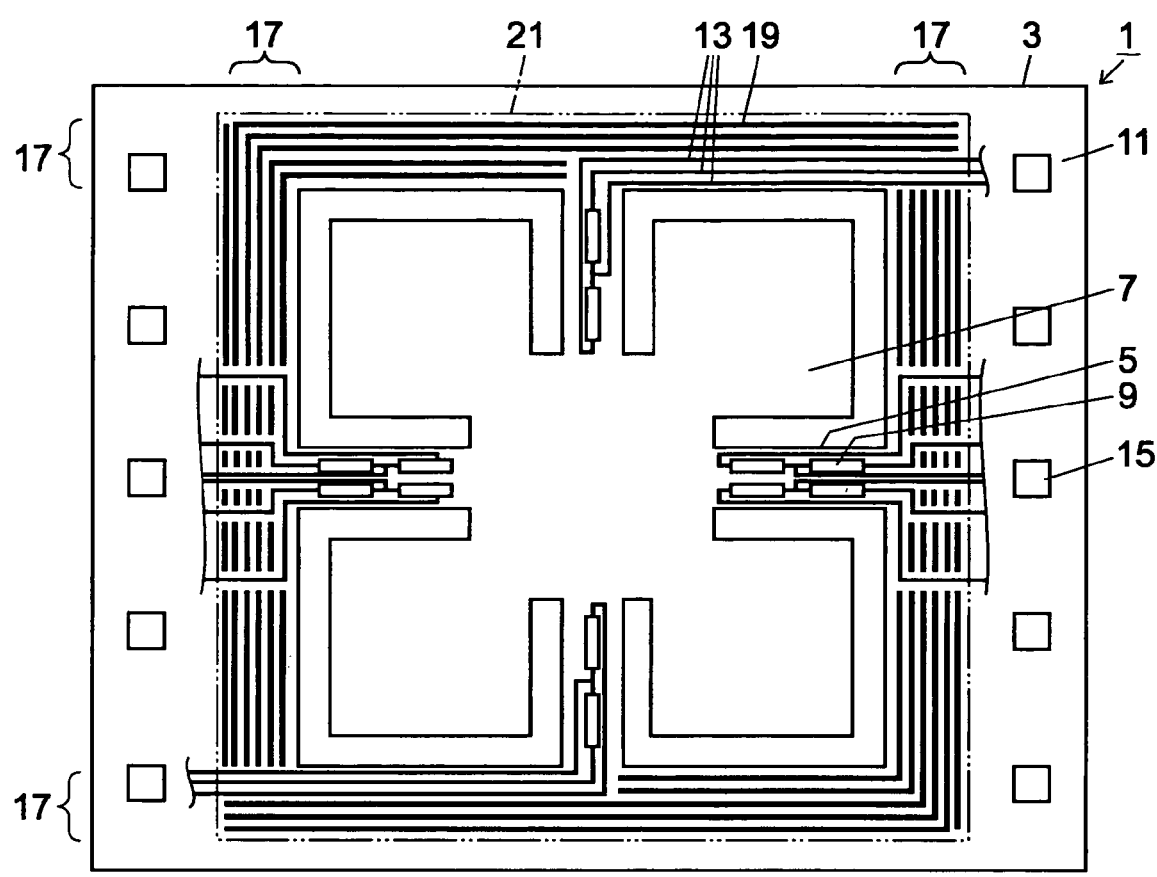
FIG. 2 is a plan view of a semiconductor sensor according to another embodiment of the present invention.
Figure 3:
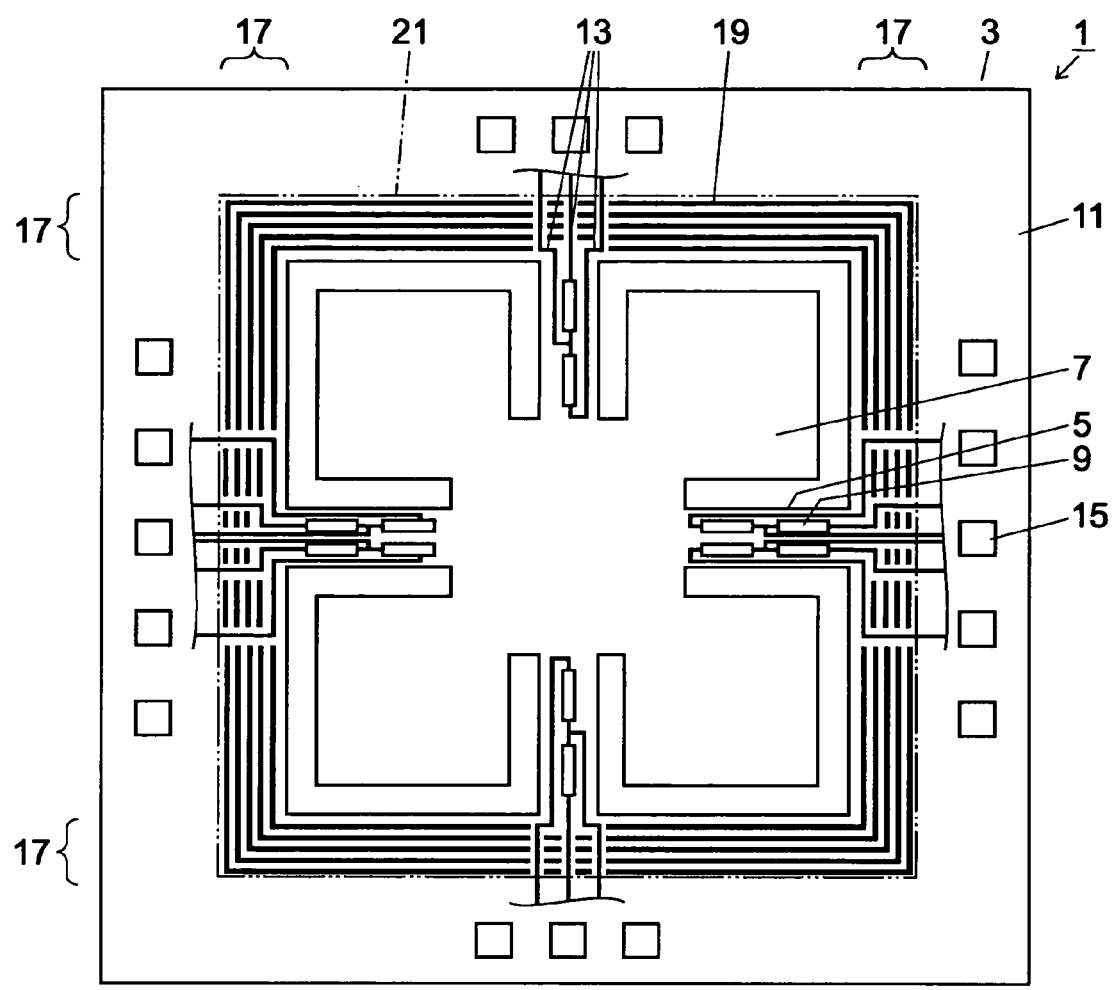
FIG. 3 is a plan view of a semiconductor device according to another embodiment of the present invention.

However, it is noted that the present invention is not limited to such an embodiment, and in other embodiments, the pad electrodes 15 may be arranged along two sides of the frame 3 as is illustrated in FIG. 2, or the pad electrodes 15 may be arranged along four sides of the frame 3 as is illustrated in FIG. 3, for example.

Also, it is noted that in the embodiment described above with reference to FIGS. 1A and 1B, the cover plate 21 is fixed to the frame 3 through anodic bonding; however, in another embodiment, the cover plate 21 may be made of welded glass, for example. In this case, the cover plate 21 may be welded to the frame 3. In one specific example, ASF1307 (by Asahi Glass Co., Ltd.) may be used as the welded glass.

Figure 4A:
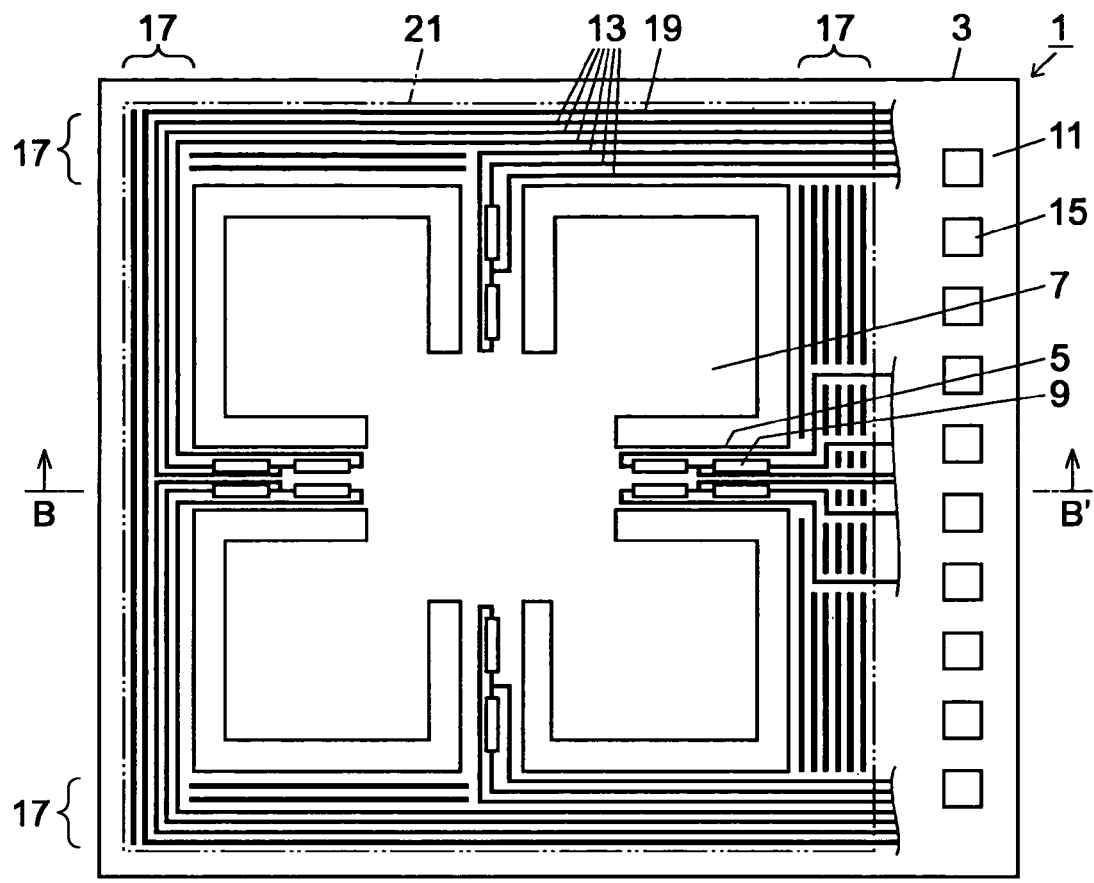
FIGS. 4A and 4B are diagrams showing a configuration of a semiconductor sensor according to another embodiment of the present invention, FIG. 4A being a plan view of the semiconductor sensor of the present embodiment, and FIG. 4B being a cross-sectional view cut across line B-B' of FIG. 4A.
Figure 4B:
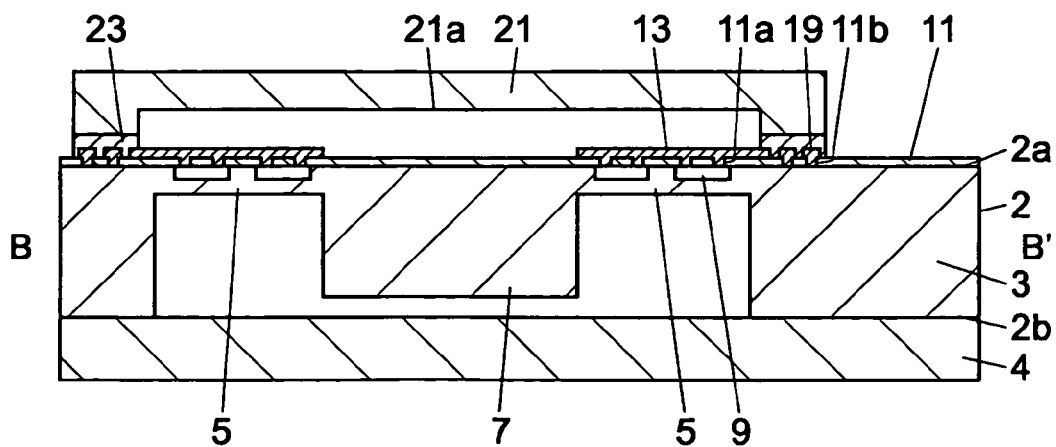

FIGS. 4A and 4B are diagrams illustrating a semiconductor sensor according to another embodiment of the present invention, FIG. 4A being a plan view of the semiconductor sensor according to the present embodiment, and FIG. 4B being a cross-sectional view cut across line B-B' of FIG. 4A. It is noted that in these drawings, components that are identical to those shown in FIGS. 1A and 1B are given the same reference numerals, and their descriptions are omitted.

The present embodiment differs from the embodiment shown in FIGS. 1A and 1B in that the cover plate 21 is fixed to the cover plate fixing region 17 of the frame 3 by adhesive 23. It is noted that ABLEBOND GA-4 (by Ablestik Japan Co., Ltd.) may be used as the adhesive 23, for example.

In the case of fixing the cover plate 21 to the frame 3 through welding using welded glass or through the use of adhesive, the through holes 11b for connecting the dummy patterns 19 to the silicon layer of the SOI substrate 2 do not necessarily have to be created.

Also, in the embodiment of FIGS. 1A and 1B, the concave portion 21a is arranged at the cover plate 21; however, in the present embodiment, the concave portion 21a does not necessarily have to be created provided that the cover plate 21 may be spaced apart from the beam 5 and the proof mass 7 by a predetermined distance when the cover plate 21 is fixed to the frame 3.

Figure 5A:
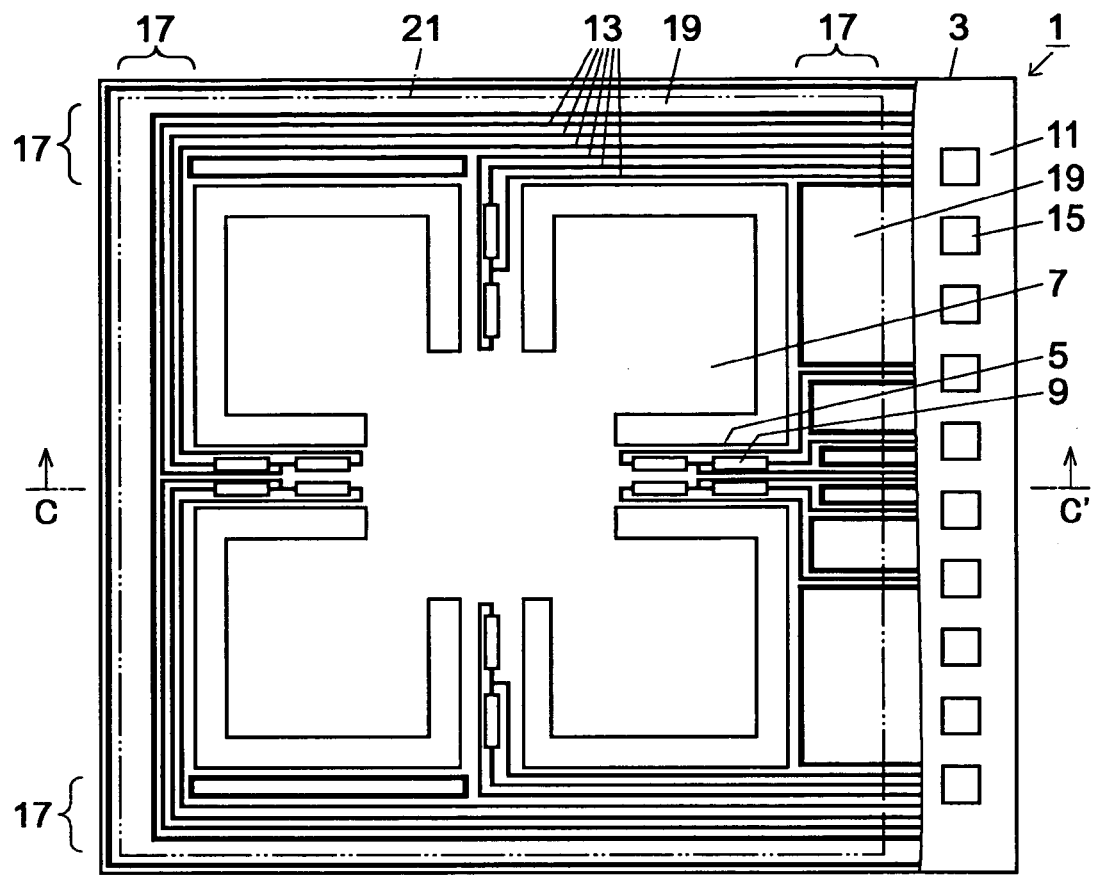
FIGS. 5A and 5B are diagrams showing a configuration of a semiconductor sensor according to another embodiment of the present invention, FIG. 5A being a plan view of the semiconductor sensor of the present embodiment, and FIG. 5B being a cross-sectional view cut across line C-C' of FIG. 5A.
Figure 5B:
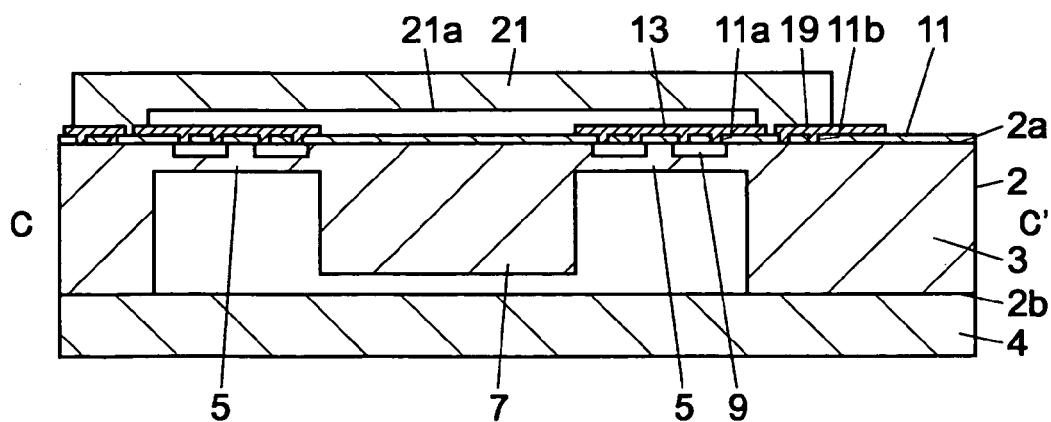

It is noted that in the embodiments described above with reference to FIGS. 1A, 1B, 2, 3, 4A, and 4B, liner patterns are used as the dummy patterns 19. However, the present invention is not limited to such an embodiment, and for example, the dummy patterns 19 may be arranged into plate-shaped patterns as is shown in FIGS. 5A and 5B. In this case, the dummy patterns 19 positioned close to the pad electrodes 15 may be arranged such that their end portions are spaced apart from the pad electrodes 15 by a predetermined distance, or the end portions of the dummy patterns 19 may be arranged to be adjacent to the pad electrodes 15 or be arranged to surround the pad electrodes 15, for example.

In the embodiment shown in FIGS. 5A and 5B, the dummy patterns 19 are electrically connected to the silicon layer of the SOI substrate 2 via through holes 11b. In a case where the cover plate 21 is connected to the SOI substrate 2 through anodic bonding, the dummy patterns 19 become the connecting interface, and thereby, the dummy patterns 19 are preferably arranged at the cover plate fixing region 17 at regions other than the metal wiring pattern 13 formation regions. Also, the dummy patterns 19 are preferably arranged at the peripheral regions of the cover plate fixing region 17 as well.

It is noted that the semiconductor sensor of FIGS. 5A and 5B has a configuration that is identical to that shown in FIGS. 1A and 1B other than the fact that plate-shaped dummy patterns 19 are used in place of the linear dummy patterns 19; however, the present invention is not limited to such an embodiment, and the plate-shaped dummy patterns 19 may be used in the configurations of FIGS. 2, 3 and 4 as well. Also, in another embodiment, a combination of linear patterns and plate-shaped patterns may be used as the dummy patterns 19.

According to other embodiments, plate-shaped or linear dummy patterns 19 may be arranged at peripheral regions of the cover plate fixing region 17 in the semiconductor sensors shown in FIGS. 2, 3, and 4, for example.

Although the present invention is shown and described with respect to certain preferred embodiments, the materials, the dimensions, the shapes, and the arrangements of components including the arrangement of the metal wiring patterns and the arrangement of the dummy patterns described above are merely illustrative examples, and it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-001239 filed on Jan. 6, 2005, the entire contents of which are hereby incorporated by reference.

What is claimed is:

1. A semiconductor sensor comprising:
   a proof mass;
   a frame that is arranged around the proof mass;
   a beam that is arranged at a surface side of the frame and is configured to support the proof mass;
   a plurality of piezo-resistive elements arranged on the beam;
   an insulating film arranged on the surface side of said frame and beam supporting said proof mass of said semiconductor sensor, and said insulating film having through-holes corresponding to edge positions of the piezo-resistive elements;
   a plurality of metal wiring patterns and a plurality of pad electrodes arranged on the insulating film, said metal wiring patterns passing through said through-holes of said insulating film to electrically connect to the piezo-resistive elements;
   a cover plate that is fixed to the surface side of the frame via the insulating flim and is arranged to be spaced apart from the proof mass and the beam; and
   a cover plate fixing region for fixing the cover plate to the surface side of the frame, the cover plate fixing region including a formation region for the metal wiring patterns.

2. The semiconductor sensor as claimed in claim 1, wherein the cover plate fixing region is arranged to surround the proof mass and the beam.

3. The semiconductor sensor as claimed in claim 2, wherein the pad electrodes are collectively arranged along one side edge of the frame.

4. The semiconductor sensor as claimed in claim 1, wherein the cover plate is a transparent glass plate that allows the proof mass and the beam to be visible.

5. The semiconductor sensor as claimed in claim 1, wherein the surface of the frame is made of a silicon layer, and the cover plate is a glass plate that is fixed to the cover plate fixing region through anodic bonding.

6. The semiconductor sensor as claimed in claim 1, wherein the cover plate is a welded glass plate that is fixed to the cover plate fixing region through welding.

7. The semiconductor sensor as claimed in claim 1, wherein the cover plate is fixed to the cover plate fixing region by adhesive.

8. The semiconductor device as claimed in claim 1, wherein the cover plate fixing region includes a dummy pattern that is simultaneously created with the metal wiring patterns, and a height of the cover plate fixing region is uniform.

9. The semiconductor sensor as claimed in claim 1, wherein the beam and the surface of the frame are made of a same silicon layer, and a dummy pattern is arranged in the cover plate fixing region and on the silicon layer via said insulating film.

10. The semiconductor sensor as claimed in claim 1, wherein the beam and the surface of the frame are made of a same silicon layer, and a dummy pattern is arranged in the cover plate fixing region and is electrically connected to the silicon layer, via a through hole that is arranged in the insulating film.

11. The semiconductor sensor as claimed in claim 10, wherein the dummy pattern is not electrically connected to any or the piezo-resistive elements, the metal wiring patterns, and the pad electrodes.

12. The semiconductor sensor as claimed in claim 1, wherein the beam and the surface of the frame are made of a same silicon layer, and a dummy pattern is arranged in the cover plate fixing region and is electrically connected to the silicon layer, such that the dummy patterns is set to the same potential as that of the silicon layer.

13. The semiconductor sensor as claimed in claim 1, further comprising a substrate and a glass pedestal attached to a rear face of said substrate.

14. A semiconductor sensor comprising:
a proof mass;
a frame that is arranged around the proof mass;
a beam that is arranged at a surface side of the frame and is configured to support the proof mass;
a plurality of piezo-resistive elements arranged on the beam;
an insulating film arranged on the surface side of said frame and on a surface of the beam, and said insulating film having through-holes corresponding to edge positions of the piezo-resistive elements;
a plurality of metal wiring patterns and a plurality of pad electrodes arranged on the insulating film, said metal wiring patterns passing through said through-holes of said insulating film to electrically connect to the piezo-resistive elements;
a cover plate that is fixed to the surface side of the frame via the insulating film and is arranged to be spaced apart from the proof mass and the beam; and
a cover plate fixing region for fixing the cover plate to the surface side of the frame,
wherein the beam and the surface side of the frame are made of a same silicon layer, and the cover plate fixing region includes a dummy pattern electrically connected to the silicon layer, via a through hole that is arranged in the insulating film.

15. The semiconductor sensor as claimed in claim 14, wherein the dummy pattern is not electrically connected to any of the piezo-resistive elements, the metal wiring patterns, and the pad electrodes.

16. The semiconductor sensor as claimed in claim 14, wherein the dummy pattern is arranged on the silicon layer via said insulating film.

17. The semiconductor sensor as claimed in claim 14, wherein the dummy pattern is arranged on a peripheral regions of the cover plate fixing region.

* * * * *